US007936284B2

(12) United States Patent
Levine et al.

(10) Patent No.: US 7,936,284 B2
(45) Date of Patent: May 3, 2011

(54) SYSTEM AND METHOD FOR PARKING TIME ESTIMATIONS

(75) Inventors: Uri Levine, Kfar Saba (IL); Amir Shinar, Moshav Herut (IL); Ehud Shabtai, Tel-Aviv (IL)

(73) Assignee: Waze Mobile Ltd, Ra'anana (IL)

( * ) Notice: Subject to any disclaimer, the term of this patent is extended or adjusted under 35 U.S.C. 154(b) by 440 days.

(21) Appl. No.: 12/199,212

(22) Filed: Aug. 27, 2008

(65) Prior Publication Data

US 2010/0052946 A1 Mar. 4, 2010

(51) Int. Cl.
*B60Q 1/48* (2006.01)

(52) U.S. Cl. ..................... 340/932.2; 340/934; 340/928; 340/989; 340/994

(58) Field of Classification Search ............... 340/932.2, 340/934, 928, 989, 994
See application file for complete search history.

(56) References Cited

U.S. PATENT DOCUMENTS 7,253,747 B2 * 8/2007 Noguchi .................... 340/932.2
7,474,232 B2 * 1/2009 Chen et al. ................. 340/932.2
7,516,010 B1 * 4/2009 Kaplan et al. ................. 701/201
7,538,690 B1 * 5/2009 Kaplan et al. .............. 340/932.2
7,805,239 B2 * 9/2010 Kaplan et al. ................. 701/201
2004/0107048 A1 6/2004 Yokota
2005/0253753 A1 11/2005 Lalik et al.
2005/0280555 A1 12/2005 Warner
2006/0287818 A1 12/2006 Okude et al.
2007/0069923 A1 * 3/2007 Mendelson ................... 340/988
2010/0042318 A1 * 2/2010 Kaplan et al. ................. 701/204

OTHER PUBLICATIONS

International Search Report for PCT/IB2009/053179 dated Dec. 8, 2009.

* cited by examiner

*Primary Examiner* — Travis R Hunnings
(74) *Attorney, Agent, or Firm* — Eitan Mehulal Law Group

(57) ABSTRACT

The invention provides a system for parking time estimations, the system comprising at least one device able to sense at least momentary location and respective time; and an application server to receive from a plurality of the devices time series of location points and to calculate, based on the received time series of location points, duration of searches for parking spots. The invention provides a method for parking time estimations, the method comprising detecting beginning of searching for a parking spot by a user of a device able to sense at least momentary location and respective time; detecting time of parking; and calculating at least estimated duration of searching for a parking spot.

20 Claims, 3 Drawing Sheets

SYSTEM AND METHOD FOR PARKING TIME ESTIMATIONS

BACKGROUND OF THE INVENTION

Parking and searching for a parking spot has became a major issue, especially for people who live in crowded cities. In many cases, the duration of searching for a parking spot should be taken into account in order to arrive to a destination on time. At most cases, a driver may be clueless as to where a parking spot may be available, how should he arrive to an available parking spot, the duration of parking queue and, for example, how much the parking will cost.

In some cases, billboards are provided in the streets to indicate the location of parking spaces, usually parking spots/parking lots which require payment of fee, and/or the number of parking spots which are available in the area/parking lot. However, these billboards are usually provided mainly for parking lots operated by the municipality and at any case do not provide the full picture of the availability of parking spaces in the area.

The presently available indications on parking spots, which include mainly billboards in the streets, provide the information only when the driver is in the vicinity of the parking lot/space.

Therefore, the presently available indications on parking spots may not help a driver in planning the travel in advance, cannot provide information regarding the duration of searching for a parking spot and cannot provide information regarding recommended paths and/or locations to search for a parking spot.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
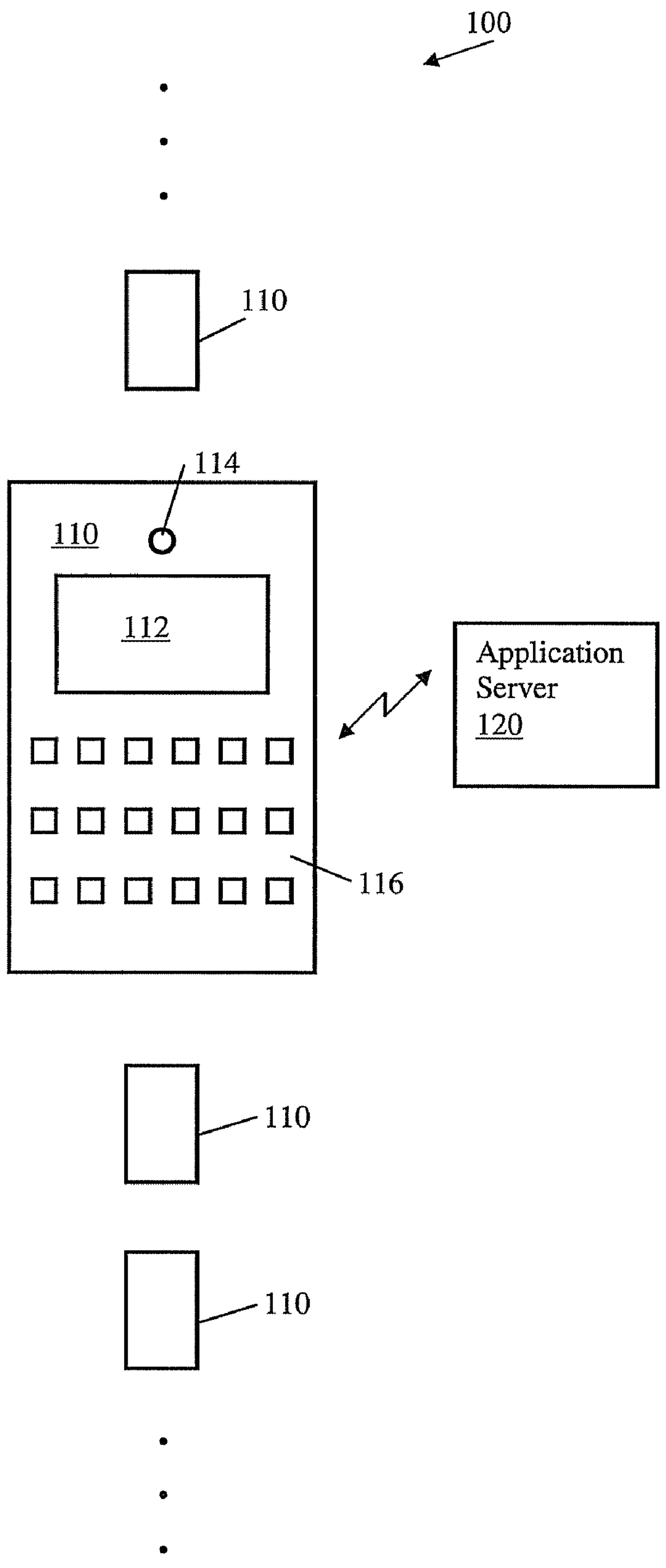
FIG. 1 is a schematic illustration of a system for parking time estimations according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The present invention may provide a system and method for parking time estimations, the system and method may provide to a user rich picture of the availability of parking spaces in an area, optionally according to relevant time in a day and/or to a day in a week. The system and method may provide to a user information which may help a driver in planning the travel in advance, information regarding the expected duration of searching for a parking spot, information regarding recommended paths and/or locations to search for a parking spot and/or any other parking-related information, for example, as described in detail herein below.

Reference is now made to FIG. 1, which is a schematic illustration of a system 100 for parking time estimations according to some embodiments of the present invention. System 100 may be used for additional purposes, for example, exchange of traffic information between users and/or creation of a road map according to information received from users.

System 100 may include a plurality of Communication and/or navigation devices 110, each of devices 110 may belong to a user of a parking service which may be provided by system 100. Communication and/or navigation devices 110 may include, for example, GPS devices, mobile phones, Personal Digital Assistants (PDA), Personal Navigation Devices (PND), car personal computer (PC), mobile computers, sensors, or any other suitable devices able to include, receive and manipulate and/or operate software and/or device which is capable of identifying its own location and time and either send it or store it and/or any sensor which may sense and record at least momentary location and respective time.

Device 110 may include, for example, a display 112, on which a navigational map and/or other means of indication of navigational information may be displayed. The navigational map may be created by application server 120 or received from any other source. Additionally, messages, questions, and/or other information may be displayed on display 112. The messages, questions, and/or other information may be received from application server 120 and/or from other devices 110 or other suitable devices. Device 110 may also include keyboard 116, for example, to control device 110 and/or for entering messages, alerts, and other information, for example, in order to send it to application server 120 and/or to other devices 110 and/or any other suitable device. Device 110 may additionally include speaker 114, which may enable receiving voice messages, instructions and/or alerts.

The plurality of devices 110 may have connectivity capability and/or may be in communication with application server 120, for example, by a cellular network or wireless network or any other mobile communication means. The connection between devices 110 and application server 120 may be made by any known connection protocol, for example, Transmission Control Protocol (TCP), User Datagram Protocol (UDP), Hypertext Transfer Protocol (HTTP), Wireless Application Protocol (WAP) or any other suitable protocol.

Application server 120 may receive from device 110, for example, periodically, momentary locations of the user holding device 110. Momentary location may be received, for example, in response to a request from application server 120. Application server 120 may collect and/or record time series of locations received from device 110 along with time stamps indicating the time at which each of the locations was recorded. In some embodiments, device 110 may record momentary locations together with corresponding time stamps indicating the recordation times of these momentary locations. A momentary location may be recorded by device 110, for example, in constant time intervals, for example, once in a second, or/and in constant travel distances, for example, every ten meters. Application server 120 may receive a time series of location points, along with the time stamps indicating the time at which each of the location points was recorded. Time series of location points may be received by application server 120 in constant time intervals as desired, for example, every five minutes.

Additionally, the users may send to application server 120, for example, by device 110, information on different events, for example, traffic information and/or alerts and/or messages to other members.

Application server 120 may perform statistical analysis of the received time series of location points from a plurality of devices 110. Based on the statistical analysis, application server 120 may deduce routes, locations, directions of travel and other traffic parameters and/or may identify navigation patterns which may correspond to different road characteristics and/or patterns of behavior of traffic and/or drivers. Application server 120 may deduce from the time series of location points received from device 110, the momentary magnitudes and directions of velocities of a user carrying device 110. Application server 120 may perform analysis to identify changes in patterns with times in the day and/or days in the week.

Based on analysis of the received data, application server 120 may create a road map and/or provide different kinds of information to the users, such as, for example, preferred routes according to desired destination and/or to other parameters, traffic information and estimated durations of traveling in different routes. The information may be provided by application server 120 according to the area of traveling of user carrying device 110 and/or to the time in a day and/or to the day in a week.

Application server 120 may provide, for example, estimated durations of parking-spot searching, as described in detail herein below. Additionally, the estimated durations of parking-spot searching may be used by application server 120 in calculations of total duration of traveling from a beginning point to a destination.

Application server 120 may, for example, identify behavioral patterns of users. Application server 120 may identify a certain behavior as a search for a parking spot, such as, for example, when a user travels in circles around and/or in an area. In some embodiments of the present invention, application server 120 may recognize that the user is in proximity to his destination and thus, for example, the period of time from arriving to the destination area, for example when the distance from the destination gets lower than a certain threshold until a full stop of the travel, which may be interpreted as parking, may be identified by application server 120 as the search for a parking spot. The destination may be received by application server 120 from a user, for example, through device 110 or via any other device. Alternatively or/and additionally, application server 120 may deduce the destination from recognizing/learning the driving habits of the user.

In another embodiment of the present invention, application server 120 may receive a notice from the user upon parking, thus, for example, facilitating the estimation of parking-spot search duration. Application server 120 may record the location and time of the parking upon receiving the notice from a user. Additionally, application server 120 may assist the user in finding the parking location when he wishes to go back to his car, by information and/or instructions which may be provided be device 110.

Application server 120 may accumulate parking-related information, for example, time to find parking spots in an area, number and/or percentage of parking spots in an area, for example, compared to information indicating the known total number of parking spots in that area, the occupancy of the parking spots in an area, rate of evacuation and/or occupation of parking spots, number of vehicles entering and/or going out of an area, costs of parking, proximity of parking spots to a destination of a user and other parking-related information which may facilitate parking time estimations and/or the potential time for acquiring a parking spot. Application server 120 may receive the information and/or calculate the information from data received, for example, from devices 110 (for example, as described in detail above), street parking meters, parking payment systems, street video cameras, manual input from users, satellite cameras, road sensors and/or from any other suitable source.

In an exemplary embodiment of the present invention, application server 120 may receive from a street camera and/or satellite camera parking-related information and/or calculate parking-related information from data received from a street camera and/or satellite camera such as, for example, the amount of parking spots in an area and/or the amount of unoccupied parking spots in an area. The data from a street camera and/or satellite camera may be received at a given intervals of time and thus, for example, application server 120 may identify rate of evacuation and/or time of occupation of parking spots. Application server 120 may use this information, for example, for calculation of estimated time to park.

In another exemplary embodiment of the present invention, application server 120 may receive from parking payment systems and/or from parking lot controls the times in which parking spots are occupied and/or evacuated and, optionally, the total number of parking spots controlled by the parking payment systems/controls. Application server 120 may deduce from this information, for example, an estimated evacuation rate of the parking spots and/or expected number of available parking spots at a given time.

In some embodiments, application server 120 may receive the costs of parking in different parking spots/parking lots, for example, from parking payment systems and/or from parking lot controls and provide this information to the user.

Application server 120 may calculate parking-related information such as, for example, the information identified above, by performing statistical analysis and/or deterministic calculations based on received and/or calculated data.

Application server 120 may, for example, perform statistical analyses on accumulated/calculated parking spot searching time estimations and deduce from the statistical analyses estimated parking spot searching times in different areas and/or different times in a day and/or day in a week.

Application server 120 may provide the accumulated and/or calculated parking-related information to a user, for example, by sending the information to device 110. Application server 120 may notify a user, for example, how much time it may take to find a parking spot in proximity to a destination point in a certain time in a day and/or day in a week. Application server may provide the information to a user when the user approaches and/or drawing near a destination and/or upon a request from a user. In some embodiments of the present invention, a user may indicate for application server 120 parameters of a preferred parking space and, for example, receive from application server the time to find a parking space which may correspond to the user preferences. Parameters of a preferred parking space which may be indicated to application server 120 by a user may be, for example, costs of a parking space, proximity to a destination, time to park and/or other suitable parameters. In one exemplary embodiment of the present invention, a user may indicate, for example, that the parking space should be a free parking space (without costs) and/or the cheapest parking space available in an identified area. In another exemplary embodiment of the present invention, a user may indicate that the parking space should be the closest parking spot available in an identified area to the destination. In another exemplary embodiment of the present invention, a user may indicate that the parking space should be the parking spot with the shortest time to park.

Application server 120 may also provide to a user, for example, based on the statistical analyses on accumulated/calculated parking spot searching time, estimations in different areas and/or different times in a day and/or day in a week, preferred paths of searching for a parking spot, for example, according to the area and/or time in a day and/or day in a week. For example, application server 120 may provide to a user, for example, when approaching a destination and/or upon request of the user, a path for searching for a parking spot and/or a location of parking spot with the shortest search duration and/or with the closest and/or cheapest parking spots available, for example, according to a user pre-defined preferences. The preferred path for searching and/or the location of a parking spot may be displayed on a map which may be displayed on display 112 of device 110. Additionally or alternatively, application server 120 may provide navigation instructions to guide the user in the preferred path and/or to the preferred location on display 112 or by speaker 114.

Figure 2:
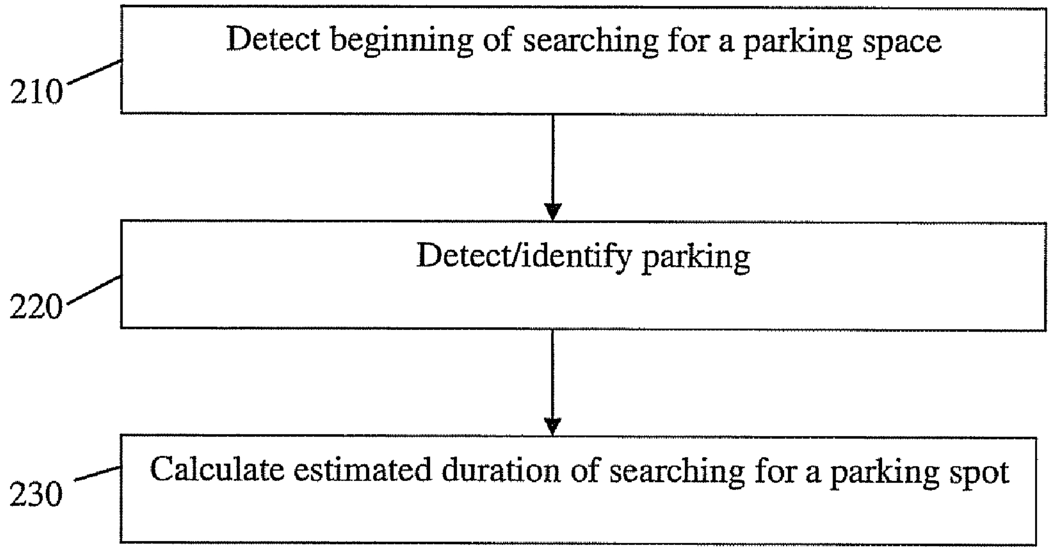
FIG. 2 is a flowchart illustrating a method for parking time estimations according to some embodiments of the present invention.

Reference is made to FIG. 2, which is a flowchart illustrating a method for parking time estimations according to some embodiments of the present invention. As shown in block 210, the method may include detecting beginning of searching for a parking space, for example, by application server 120. Application server 120 may detect beginning of searching for a parking space by, for example, detecting a pattern of travelling, for example, of a user, the pattern identified by application server 120 to be corresponding to searching for a parking space. Application server 120 may identify a certain behavior as a search for a parking spot, such as, for example, when a user travels in circles, or substantially closed patterns, around and/or in an area of a certain spot. In some embodiments of the present invention, application server 120 may use information regarding destination of a user in order to identify search for a parking spot, for example, as described in detail above.

As shown in block 220, the method may include detecting and/or identifying parking. Application server 120 may identify parking when, for example, a user stops and/or has a very slow velocity (in case, for example, that the user gets out of the car and starts walking). For example, application server 120 may identify parking when a user has a velocity below a certain pre-defined threshold which may be followed, in some embodiments, with a full stop of the user for, for example, over a certain period of time. Additionally, application server 120 may identify that the user deviates from an identified road before stopping and thus, for example, may identify that the user has reached parking. In another embodiment of the present invention, application server 120 may receive a notice from the user upon parking to indicate his/her entering status of parking.

As shown in block 230, the method may include calculating the estimated duration of searching for a parking spot. Application server 120 may calculate the time period of searching for a parking spot by, for example, extracting the period of time between the detected beginning of searching for a parking space and between the detected parking.

Figure 3:
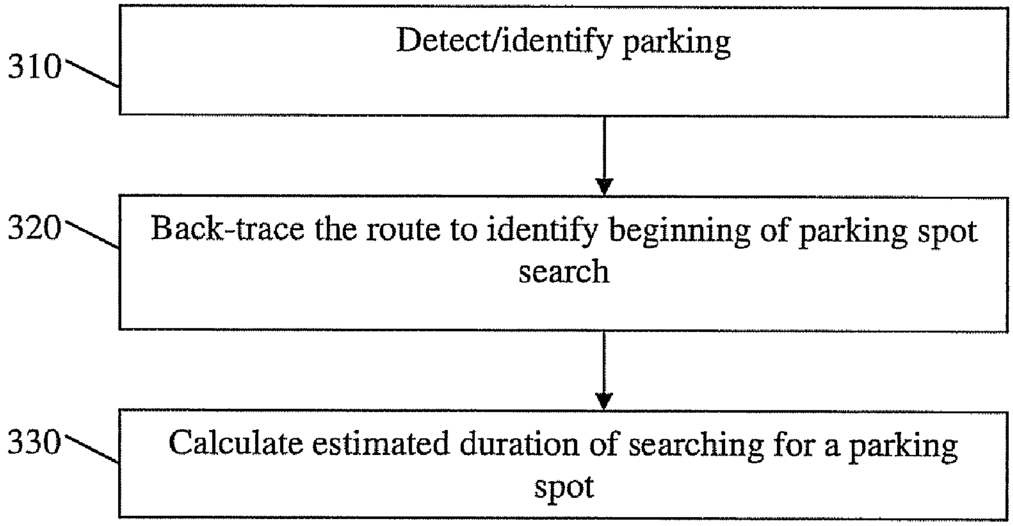
FIG. 3 is a flowchart illustrating another method for parking time estimations according to some embodiments of the present invention.

Reference is made to FIG. 3, which is a flowchart illustrating another method for parking time estimations according to some embodiments of the present invention, for example, when the destination is not known to Application server 120. As shown in block 310, the method may include detecting and/or identifying parking. Application server 120 may identify parking when, for example, a user stops and/or then has a very slow velocity (in case, for example, that the user gets out of the car and starts walking). For example, application server 120 may identify parking when a user has a velocity below a certain pre-defined threshold. In another embodiment of the present invention, application server 120 may receive a notice from the user upon parking. As shown in block 320, the method may include back-tracing the route to identify beginning of parking spot search. The back-tracing may include detecting by application server 120 a pattern of traveling; the pattern may be identified as corresponding to searching for a parking spot. For example, application server 120 may identify a period of traveling in circles around and/or in an area before the identified parking as a period of searching for a parking-spot, and identify the beginning of this period as the beginning of parking spot searching. As shown in block 330, the method may include calculating estimated duration of searching for a parking spot by, for example, extracting the period of time between the detected beginning of searching for a parking space and between the detected parking.

Application server 120 may store data of calculated duration of searching for parking-spot from different areas and/or times in a day and/or days in a week. The data may be calculated, for example, by the methods described above with reference to FIGS. 2 and 3. Application server 120 may use this data for statistical analysis of the parking-spot searching times in different areas and/or times in a day and/or days in a week, for example, in order to provide estimated expected searching times for parking in a certain area and/or time.

Figure 4:
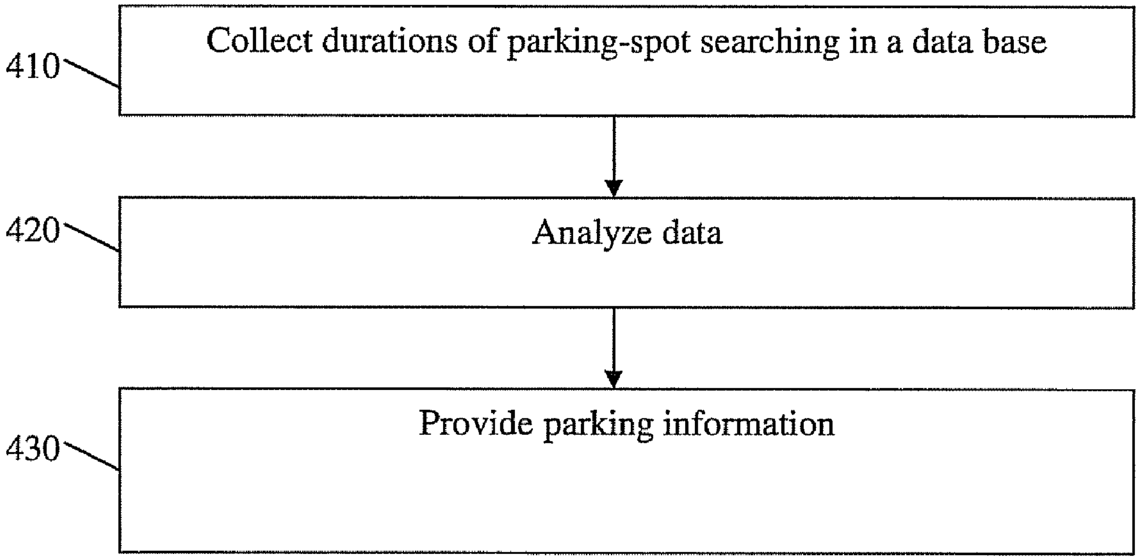
FIG. 4 is a flowchart illustrating a method for providing parking information according to some embodiments of the present invention.

Reference is made to FIG. 4, which is a flowchart illustrating a method for providing parking information according to some embodiments of the present invention. As shown in block 410, the method may include collecting data of durations of parking-spot searching in a data base. The durations may be calculated in one of the methods described above with reference to FIGS. 2 and 3 and/or be acquired from other source. As shown in block 420, the method may include analyzing the data. The analysis may be, for example, statistical analysis of the data according to the different areas and/or times in a day and/or day in a week corresponding to the durations. As shown in block 430, the method may include providing parking information, for example, acquired based on the analysis of the data of durations of parking-spot searching and/or other data. The provided parking information may be for example, estimated parking search durations, number of available and/or unoccupied parking spaces, preferred search paths and/or locations and/or any other parking-related information described above with reference to FIGS. 1, 2 and 3.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A system for parking time estimations, the system comprising:

at least one device able to sense at least momentary location and respective time; and an application server to receive from a plurality of said devices time series of location points and to calculate, based on said received time series of location points, duration of searches for parking spots.

2. A system according to claim 1, wherein said application server is configured to calculate said durations by identifying traveling patterns corresponding to searching for a parking spot.

3. A system according to claim 2, wherein said application server is configured to identifying traveling patterns corresponding to searching for a parking spot by performing statistical analysis of said time series.

4. A system according to claim 1, wherein said application server is configured to provide at least an estimated expected duration of search for a parking spot in a certain area and/or time in a day and/or day in a week, by performing statistical analysis of said calculated durations.

5. A system according to claim 1, wherein said application server is configured to accumulate parking-related information including at least one of a list comprising time to find parking spots in an area, number and/or percentage of parking spots in an area, the occupancy of the parking spots in an area, rate of evacuation and/or time of occupation of parking spots, duration of parking queue, number of vehicles entering and/or going out of an area, costs of parking, proximity of parking spots to destination and other parking-related information which may facilitate parking time estimations and/or the potential time for acquiring a parking spot.

6. A system according to claim 5, wherein said application server is configured to provide the information to a user of said device.

7. A system according to claim 5, wherein said application server is configured to receive said information and/or calculate the information from data received from at least one of said devices, street parking meters, parking payment systems, street video cameras, satellite cameras, sensors and manual input.

8. A system according to claim 1, wherein said application server is configured to provide a preferred path of searching and/or location of a preferred parking spot according to preferences of a user.

9. A system according to claim 1, wherein said application server is configured to provide instructions to a user to guide the user in a searching path and/or to a location of a parking spot.

10. A method for parking time estimation, the method comprising:

detecting beginning of searching for a parking spot by a user of a device able to sense at least momentary location and respective time;

detecting time of parking; and calculating at least estimated duration of searching for a parking spot.

11. A method according to claim 10, wherein said detecting beginning of searching for a parking spot comprises detecting a pattern of traveling, the pattern identified as corresponding to searching for a parking spot.

12. A method according to claim 10, wherein said detecting parking comprising identifying parking when a user has velocity below a certain predefined threshold.

13. A method according to claim 10, wherein said detecting parking comprising recognizing when a user deviates from an identified road.

14. A method according to claim 10, wherein said detecting parking comprising receiving a notice from a user upon parking.

15. A method according to claim 10, wherein said calculating comprising extracting the period of time between said detected beginning and said detected parking.

16. A method according to claim 10, further comprising the steps of:

collecting data of durations of parking-spot searching;

analyzing said data; and providing parking information acquired based on at least said analysis.

17. A method according to claim 16, wherein said analyzing comprising statistical analysis of said collected data according to the different areas and/or times in a day and/or day in a week corresponding to said durations.

18. A method according to claim 16, wherein said parking information comprising at least one of a list comprising estimated parking search durations, number of available and/or unoccupied parking spaces and preferred search paths and/or locations of parking spots.

19. A method for parking time estimations, the method comprising:

detecting parking;

back-tracing route to detect beginning of searching for a parking spot; and calculating at least estimated duration of searching for a parking spot.

20. A method according to claim 19, wherein said back-tracing comprises detecting a pattern of traveling, the pattern identified as corresponding to searching for a parking spot.

* * * * *